March 7, 1961 F. R. GRUNER 2,973,830
AIR CLEANING MEANS
Filed Oct. 16, 1958 2 Sheets-Sheet 1

INVENTOR.
FREDERICK R. GRUNER
BY Lawrence J. Winter
ATTORNEY

2,973,830

AIR CLEANING MEANS

Frederick R. Gruner, Westfield, N.J., assignor to Purolator Products, Inc., Rahway, N.J., a corporation of Delaware Filed Oct. 16, 1958, Ser. No. 767,678

8 Claims. (Cl. 183—45)

The present invention relates to air cleaning means, and more particularly to an air filter for use in high dust areas and in heavy duty applications.

An object of the present invention is to provide air cleaning means for use in heavy duty applications, for example in quarries, mines, road building, and construction work, and in locations where heavy dust, soot and smog are present.

Another object of the present invention is to provide air cleaning means provided with a cyclone pre-cleaner, a fibrous filter media, and a positive dry type filter element made of paper compounded material.

A further object of the present invention is to provide a pre-cleaner which removes a large portion of the contaminants carried in the air stream before it reaches the filter proper so that its useful life range is prolonged.

A still further object of the present invention is to provide a fibrous filter media for removing extremely fine dust in the air stream before it reaches the paper compounded filter element embodied in the filter proper.

Figure 1:
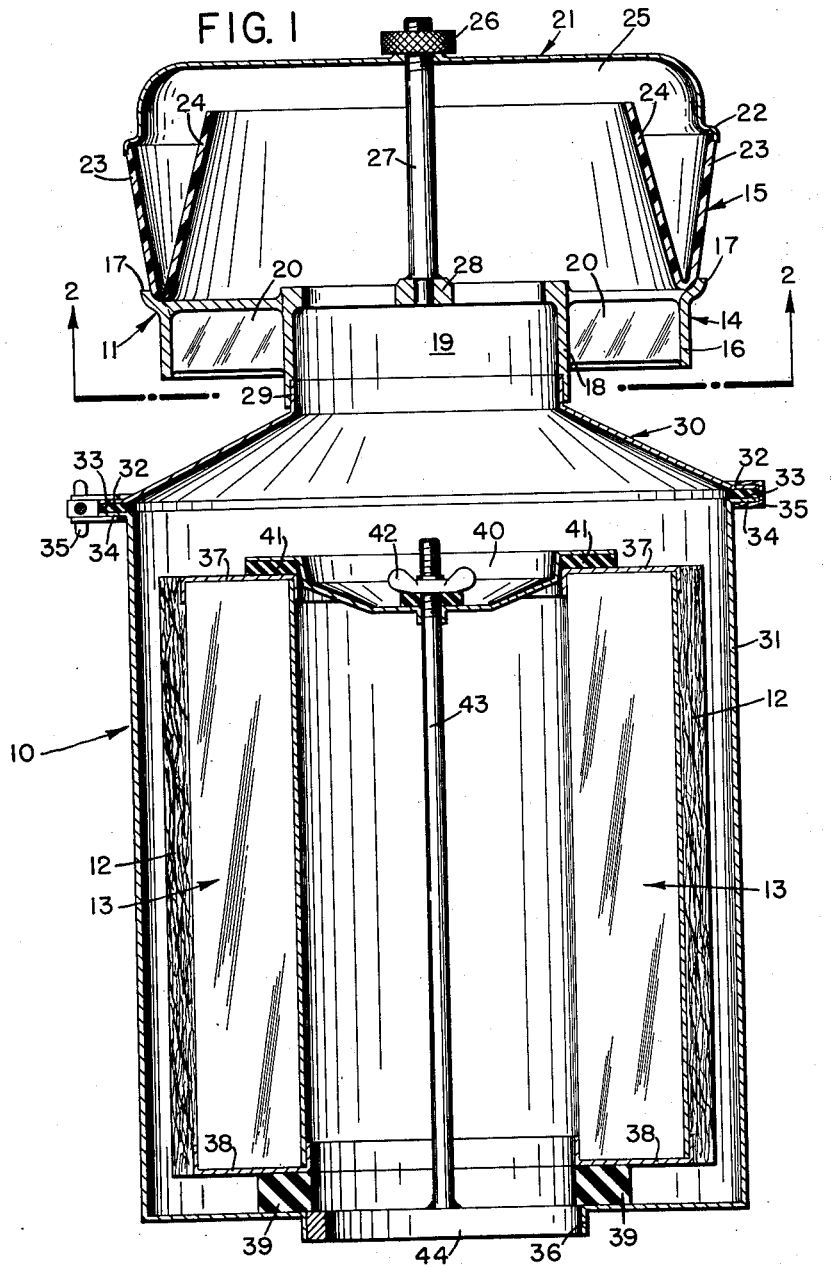
Figure 2:
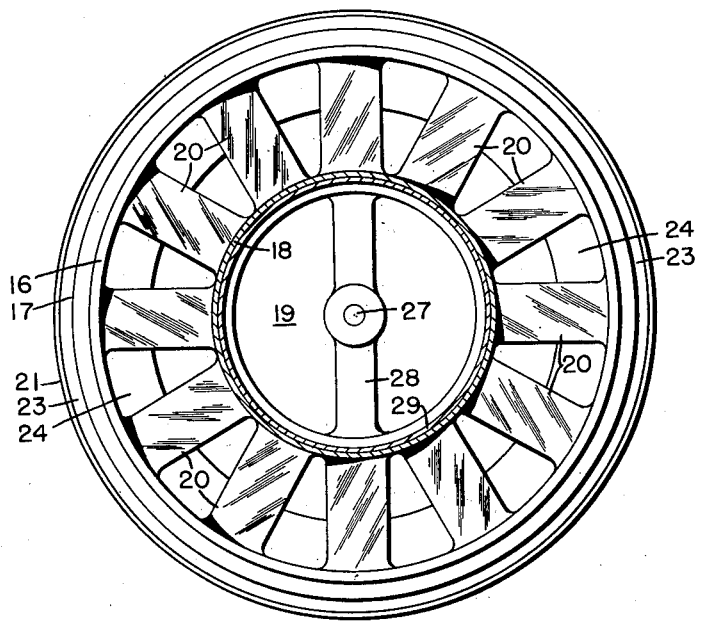

Other features of the invention will be readily seen from the following description when taken in connection with the accompanying drawings forming a part thereof and in which Fig. 1 is a side elevational view in section of the air cleaning means of the present invention, and Fig. 2 is a bottom view of the pre-cleaner embodied in the present invention looking along lines 2—2 of Fig. 1.

Referring to the drawings, the reference numeral 10 designates air cleaning means comprising a pre-cleaner 11, and a positive or dry type paper compounded filter element 13.

Pre-cleaner 11 comprises a lower section 14 and an upper section 15. Section 14 has an outer ring 16 provided with an outwardly turned arcuate lip 17 on the upper end thereof upon which seats the upper section 15. An inner ring 18 is spaced from ring 16 to form an inlet 19 for the air cleaner proper. Spaced vertical arcuate vanes 20 extend between rings 16 and 18.

Section 15 comprises a transparent plastic V-shaped annular trough or dust compartment covered by a closure member 21 provided with a flange 22 which seats on the outer leg 23 of the trough. The inner leg 24 of the dust compartment extends above leg 23 and is spaced from the inner surface of cover 21 to provide an inlet 25 to the dust compartment. Member 21 is held seated on leg 23 and section 15 is held against flange 17 by a knurled nut 26 threaded on bolt member 27 extending through the cover member and secured to a cross bar 28 formed integral with ring 18. The lower end of ring 18 is provided with a shoulder which seats on the vertical flange 29 of a conical cover member 30 for the cylindrical casing 31 housing fibrous filter media 12 and filter element 13.

Cover member 30 is provided with a horizontal flange 32 on the lower end thereof which seats against an annular gasket 33 disposed on the out turned flange 34 on the upper end of casing 31. Conventional clamping means 35 seal the cover member and casing to each other. Housing 31 is provided with a discharge opening therein by a concentric turned down flange 36 on the bottom thereof.

Filter element 13 comprises a resin impregnated annular pleated paper member having end caps 37 and 38 sealing off the ends thereof. The filter element is seated on an annular gasket 39 disposed in the bottom of the housing or casing adjacent the discharge opening. Incoming air is prevented from by-passing filter element 13 by a circular disc 40 provided with an annular gasket 41 disposed in the center opening of the annular filter element held seated against end cap 37 by wing nut 42 threaded on bolt member 43 extending through disc 40 and secured to cross bar 44 welded to flange 36.

The filter media 12 is made of fibrous material with electrostatic properties such as fibrous polyamides, acrylics, long chain hydrocarbons, or vinyl derivatives for example, and comprises a sleeve or cylinder adapted to be slipped over the periphery of filter element 13 to provide a snug fit thereon.

In operation, the suction of the engine, with which the air cleaning means of the present invention is used, will cause dirty air to be drawn into the pre-cleaner 11 through vanes 20 between rings 16 and 18. Vanes 20 cause the incoming air to be whirled as it passes into the pre-cleaner so that the dust or dirt contaminants carried therewith will be thrown upwardly and outwardly by centrifugal force passing through opening 25 into the V-shaped dust compartment of section 15. This action causes a great portion of the contaminants in the air to be removed from the moving air stream before it passes through inlet 19 to the filter proper thus reducing the load on the filter proper. Thereafter, the air stream will flow downwardly through member 30 into the annular channel formed adjacent the inner surface of housing 31, and through the fibrous nylon batting or sleeve 12. The electrostatic properties of this fibrous batting will cause the extremely fine dust particles to adhere thereto so as to remove a major portion of the fine dust particles or contaminants remaining in the air stream thus reducing the load on filter element 13, and preventing its pores from becoming clogged quickly and thereby increasing the life thereof. Thereafter, the air stream will pass through filter element 13 with any remaining contaminants therein being deposited on the pleated filter element.

Inasmuch as various changes may be made in the form, location and relative arrangement of the several parts without departing from the essential characteristics of the invention, it will be understood that the invention is not to be limited except by the scope of the appended claims.

What is claimed is:

1. Air cleaning means comprising a cyclone pre-cleaner having a dust compartment, a fibrous electrostatic filter media in communication with said pre-cleaner, and a resin impregnated paper filter element in communication with the downstream side of said filter media.

2. Air cleaning means comprising a cyclone pre-cleaner having a lower section comprising spaced rings, forming an air inlet, arcuate vanes extending between the rings, a cover member mounted on said lower section, a filter housing provided with a fibrous electrostatic filter media in communication with the downstream side of said pre-cleaner and a resin impregnated paper filter element in communication with the downstream side of said media.

3. Air cleaning means comprising a cyclone pre-cleaner having an inlet and outlet and a dust compartment therein, a filter housing having an inlet in communication with said pre-cleaner outlet, an annular resin impregnated paper filter element forming a central passage therein seated in said housing, means sealing off the ends of said element and the central passage in the top thereof, a fibrous electrostatic filter media wrapped around the outer upstream side of the filter element, and outlet means in the bottom of the housing in communication with the central passage of the filter element.

4. Air cleaning means comprising a cyclone pre-cleaner having a lower section comprising spaced rings forming an air inlet, arcuate vanes extending between the rings, an annular dust compartment mounted on said rings, a cover member mounted over said dust compartment and providing a dust inlet thereto, a filter housing having an air inlet in the top thereof, said pre-cleaner being mounted on said filter housing adjacent said air inlet, an annular resin impregnated paper filter element seated in said housing, means sealing off the upper end of said element, a fibrous electrostatic filter media wrapped around the outer upstream side of said filter element, and outlet means in the bottom of said housing in communication with the inner side of said filter element.

5. Air cleaning means comprising a cylindrical pre-cleaner having a lower section comprising inner and outer rings with vertical arcuate vanes extending therebetween to form an air inlet, an outturned flange on the upper edge of the outer ring, an annular V-shaped dust compartment seated on said flange, the inner leg of the V-shaped compartment extending above the outer leg, a cover member seated on said outer leg and spaced from the inner leg to form a dust inlet to said compartment, a filter housing having an air inlet, said pre-cleaner being mounted on said filter housing adjacent said air inlet, an annular resin impregnated pleated paper filter element forming a central passage seated in said housing, means sealing off the upper end of said pleats and center passage formed therein, a fibrous electrostatic filter media comprising a sleeve disposed over the outside upstream side of said pleats, and central outlet means in the bottom of said housing in communication with the central passage of the filter element.

6. Air cleaning means comprising a cylindrical pre-cleaner having a lower section comprising inner and outer rings with vertical curved vanes extending therebetween to form a dirty air inlet, an outturned flange on the upper edge of the outer ring, an annular V-shaped dust compartment seated on said flange, the inner leg of said V-shaped compartment extending beyond the outer leg, a cylindrical cover member seated on said outer leg and spaced from the inner leg to form a dust inlet to said compartment, a filter housing comprising a cylindrical casing and a cover member having an upturned flange providing an air inlet, the inner ring of said pre-cleaner being mounted on said upturned flange, an annular resin impregnated pleated paper filter element forming a central passage therein seated in the bottom of said casing, means sealing off the upper end of said pleats and central passage formed therein, a fibrous filter media of electrostatic properties surrounding the upstream side of said pleats, and central outlet means in the bottom of the casing below said center passage.

7. The air cleaning means of claim 6 wherein the fibrous filter media comprises nylon material.

8. The air cleaning means of claim 6 wherein the fibrous filter media comprises Dynel material.

References Cited in the file of this patent

UNITED STATES PATENTS

| 1,641,746 | Donaldson | Sept. 6, 1927 |
| 2,660,261 | Jeffrey | Nov. 24, 1953 |
| 2,724,457 | Besser | Nov. 22, 1955 |
| 2,795,290 | Butsch et al. | June 11, 1957 |
| 2,828,831 | Boretti et al. | Apr. 1, 1958 |

FOREIGN PATENTS

| 660,864 | Great Britain | Nov. 14, 1951 |